(12) United States Patent
Crawford et al.

(10) Patent No.: US 9,715,440 B2
(45) Date of Patent: Jul. 25, 2017

(54) TEST SCOPE DETERMINATION BASED ON CODE CHANGE(S)

(71) Applicant: Microsoft Corporation, Redmond, WA (US)

(72) Inventors: Brian R. Crawford, Seattle, WA (US); Stephen H. Toub, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 13/720,655

(22) Filed: Dec. 19, 2012

(65) Prior Publication Data
US 2014/0173564 A1   Jun. 19, 2014

(51) Int. Cl.
*G06F 9/45* (2006.01)
*G06F 11/36* (2006.01)

(52) U.S. Cl.
CPC ........ *G06F 11/3676* (2013.01); *G06F 11/368* (2013.01); *G06F 11/3684* (2013.01)

(58) Field of Classification Search
CPC . G06F 11/302; G06F 11/3006; G06F 11/3072
See application file for complete search history.

(56) References Cited

U.S. PATENT DOCUMENTS

| | | | |
|---|---|---|---|
| 6,779,134 B1 * | 8/2004 | Laviolette | G06F 11/3006 714/38.12 |
| 7,123,970 B1 * | 10/2006 | Stroomer | G06F 8/423 700/17 |
| 7,603,660 B2 | 10/2009 | Davia et al. | |
| 7,757,214 B1 * | 7/2010 | Palczak | G06F 9/5083 709/223 |
| 8,001,532 B1 | 8/2011 | Jakubiak et al. | |
| 8,079,018 B2 | 12/2011 | Huene et al. | |
| 2005/0278577 A1 | 12/2005 | Doong et al. | |
| 2006/0075305 A1 | 4/2006 | Robinson et al. | |

(Continued)

OTHER PUBLICATIONS

Farooq et al. ("A Model-Based Regression Testing Approach for Evolving Software Systems with Flexible Tool Support" Mar. 2010).*

(Continued)

*Primary Examiner* — Li B Zhen
*Assistant Examiner* — Lenin Paulino
(74) *Attorney, Agent, or Firm* — Wade IP Law LLC

(57) ABSTRACT

Techniques are described herein that are capable of determining a scope of testing to be performed with respect to machine code based on change(s) that occur with respect to corresponding program code. For instance, behaviors that may be exhibited during execution of the machine code may be determined based on relationships between code elements in the program code, relationships between program data elements that are produced by and/or consumed by the code elements, relationships between the code elements and the program data elements, and/or relationships between the code elements and runtime attributes of the program code. When a change is made to the program code, functionalities are recommended for inclusion in the testing of the machine code. The functionalities are defined to test the machine code with regard to those behaviors that are to be altered by the change that is made to the program code.

20 Claims, 5 Drawing Sheets

(56) References Cited

U.S. PATENT DOCUMENTS

| | | |
|---|---|---|
| 2007/0180429 A1 | 8/2007 | Gogh et al. |
| 2010/0077351 A1* | 3/2010 | Kaulgud .................. G06F 8/75 715/810 |
| 2011/0145788 A1 | 6/2011 | Xu et al. |

OTHER PUBLICATIONS

Briand et al. ("Impact Analysis and Change Management of UML Models" Sep. 2003).*

Jin et al. ("Automated Behavioral Regression Testing" Apr. 2010).*

"International Search Report & Written Opinion for PCT Patent Application No. PCT/US2013/075520", Mailed Date: Feb. 20, 2014, Filed Date: Dec. 17, 2013, 11 pages.

Farooq, et al., "A Model-Based Regression Testing Approach for Evolving Software Systems with Flexible Tool Support", In 17th IEEE International Conference and Workshops on Engineering of Computer Based Systems, Mar. 22, 2010, pp. 41-49.

Jin, et al., "Automated Behavioral Regression Testing", In Proceedings of the Third International Conference on Software Testing, Verification and Validation, Apr. 6, 2010, pp. 137-146.

Briand, et al., "Impact Analysis and Change Management of UML Models", In Proceedings of International Conference on Software Maintenance, Sep. 22, 2003, pp. 256-265.

Gousset, Mickey, "Test Impact Analysis in Visual Studio 2010", Retrieved on: May 23, 2014, Feb. 10, 2010, 5 pages.

"Microsoft Research—CHESS: Find and Reproduce Heisenbugs in Concurrent Programs", Retrieved on: May 23, 2014, 2 pages.

Egyed, Alexander, "Reasoning about Trace Dependencies in a Multi-Dimensional Space", Retrieved at Proceedings of the 1st International Workshop on Traceability, co-located with ASE 2002, Edinburgh, Scotland, UK, Sep. 2002, pp. 42-46.

"CHESS: Find and Reproduce Heisenbugs in Concurrent Programs", Retrieved from on Dec. 13, 2012, Microcoft Research, 2 pages.

Gousset, "Test Impact Analysis in Visual Studio 2010", Retrieved from on Dec. 13, 2012, Visual Studio Magazine, (Feb. 10, 2011), 5 pages.

* cited by examiner

TEST SCOPE DETERMINATION BASED ON CODE CHANGE(S)

BACKGROUND

In conventional software testing systems, when changes are made to source code that is to be tested, software engineers manually determine which tests to run on the source code and in which environments to run those tests in order to prove the quality of the changes to the source code. This process can be error prone because an engineer may not understand the various factors that may affect performance, correctness, security, reliability, and/or other aspect(s) of the source code. Accordingly, tests that are capable of testing such factors may not be identified by the software engineers to be run on the source code.

A variety of systems have been developed for automating testing of software, though each system has its limitations. For instance, some of today's state of the art systems, such as Visual Studio 2010®, enable developers and testers to use a feature that is commonly referred to as "Test Impact Analysis" to relate source code that is changed to a set of tests that exercise the changed source code (and then run those tests). Information about Test Impact Analysis may be found at http://visualstudiomagazine dot com/articles/2011/02/10/test-impact-analysis dot aspx, for example. Systems that offer Test Impact Analysis typically record the source code that is exercised by each test and create a mapping between the source code and the tests. With such a system, an engineer can determine an appropriate subset of tests to run on the source code based on runtime dependencies between components of the source code. However, this approach merely accounts for dependencies between the components.

SUMMARY

Various approaches are described herein for, among other things, determining a scope of testing to be performed with respect to a machine code representation of program code based on change(s) that occur with respect to the program code. For instance, an example method is described. In accordance with this method, a behavioral model is provided that indicates behaviors that have respective likelihoods of being exhibited by execution of the machine code representation of the program code based on relationships among code elements that are included in the program code and program data elements. Each program data element is produced by a first respective code element and/or consumed by a second respective code element. Correspondence information is stored that indicates which of the code elements corresponds to each of the behaviors. A subset of the behaviors that is to be altered by the change(s) is determined based on the correspondence information indicating that a subset of the code elements with respect to which the change(s) occur corresponds to the subset of the behaviors. A recommendation is provided that recommends inclusion of one or more functionalities in the testing based on each of the one or more functionalities being defined to test the machine code representation of the program code with regard to at least one behavior in the subset of the behaviors.

An example system is described that includes behavioral analysis logic, a store, determination logic, and recommendation logic. The behavioral analysis logic is configured to provide a behavioral model that indicates behaviors that have respective likelihoods of being exhibited by execution of the machine code representation of the program code based on relationships among code elements that are included in the program code and program data elements. Each program data element is produced by a first respective code element and/or consumed by a second respective code element. The store is configured to store correspondence information that indicates which of the code elements corresponds to each of the behaviors. The determination logic is configured to determine a subset of the behaviors that is to be altered by the change(s) based on the correspondence information indicating that a subset of the code elements with respect to which the change(s) occur corresponds to the subset of the behaviors. The recommendation logic is configured to provide a recommendation that recommends inclusion of one or more functionalities in the testing based on each of the one or more functionalities being defined to test the machine code representation of the program code with regard to at least one behavior in the subset of the behaviors.

A computer program product is described that includes a computer-readable medium having computer program logic recorded thereon for enabling a processor-based system to determine a scope of testing to be performed with respect to a machine code representation of program code based on change(s) that occur with respect to the program code. The computer program product includes a first program logic module, a second program logic module, and a third program logic module. The first program logic module is for enabling the processor-based system to provide a behavioral model that indicates behaviors that have respective likelihoods of being exhibited by execution of the machine code representation of the program code based on relationships among code elements that are included in the program code and program data elements. Each program data element is produced by a first respective code element and/or consumed by a second respective code element. The second program logic module is for enabling the processor-based system to determine a subset of the behaviors that is to be altered by the change(s) based on the correspondence information, which indicates which of the code elements corresponds to each of the behaviors, indicating that a subset of the code elements with respect to which the change(s) occur corresponds to the subset of the behaviors. The third program logic module is for enabling the processor-based system to provide a recommendation that recommends inclusion of one or more functionalities in the testing based on each of the one or more functionalities being defined to test the machine code representation of the program code with regard to at least one behavior in the subset of the behaviors This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodi- FIG. 1 is a block diagram of an example test scope system in accordance with an embodiment.

Figure 1:
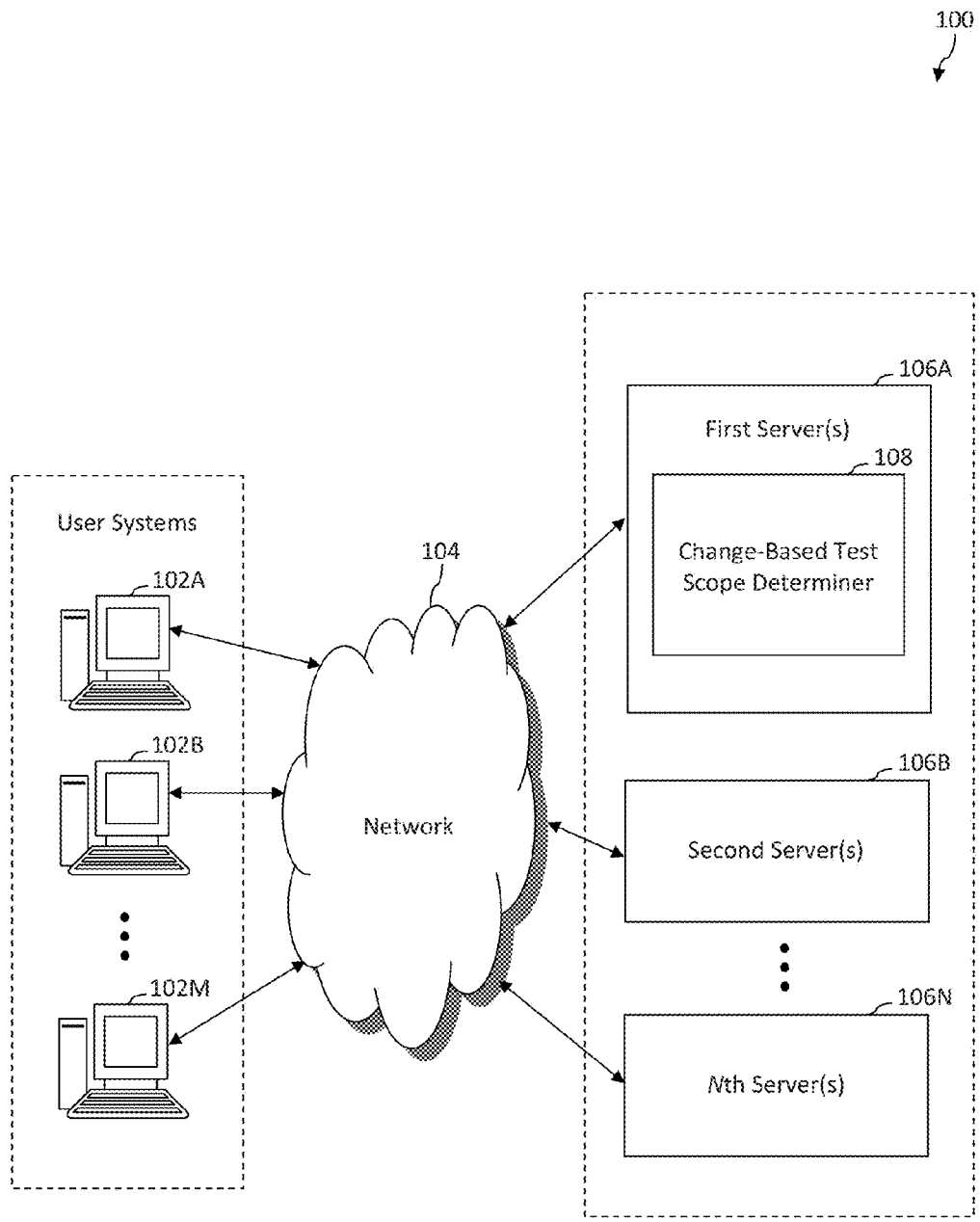

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of determining a scope of testing to be performed with respect to a machine code representation of program code based on change(s) that occur with respect to the program code. For instance, behaviors that may be exhibited during execution of the machine code representation of the program code may be derived from relationships between code elements in the program code, relationships between program data elements that are produced by and/or consumed by the code elements, relationships between the code elements and the program data elements, and/or relationships between the code elements and runtime attributes of the program code. Examples of a program data element include but are not limited to an integer, a Boolean, a character, a floating point number, an alphanumeric character, an alphanumeric string, an object, etc. When a change is made to the program code, specified functionalities are recommended for inclusion in the testing of the machine code representation of the program code. The specified functionalities are defined to test the machine code representation of the program code with regard to those behaviors that are to be altered by the change that is made to the program code.

Example techniques described herein have a variety of benefits as compared to conventional techniques for testing machine code. For instance, the example techniques may be capable of recommending test functionality by taking into consideration any of a variety of factors including but not limited to how concurrent components may interact, what role an environment of the machine code plays in its execution, how various inputs affect performance of the machine code, etc. Accordingly, the example techniques may recommend testing functionalities defined to address behaviors of the machine code that are associated with the aforementioned factors when change(s) are made to the machine code. For example, the example techniques may determine when testing of the machine code is to include running the machine code in specified environment(s) (e.g., on computers with specific numbers of processors/cores), providing specified input(s) to the machine code during execution thereof, etc. to prove the quality of the change(s) that are made to the machine code. The example techniques may be capable of selecting a subset of available functionalities to be included in testing of the machine code and/or a subset of available environments in which to test the machine code. The ability to select such subsets may save cost and/or time, as compared to techniques that require inclusion of all functionalities in the testing and/or testing in all available environments.

FIG. 1 is a block diagram of an example test scope system 100 in accordance with an embodiment. Generally speaking, test scope system 100 operates to provide information to users (e.g., software engineers, application developers, etc.) in response to requests (e.g., hypertext transfer protocol (HTTP) requests) that are received from the users. The information may include documents (e.g., Web pages, images, video files, etc.), output of executables, and/or any other suitable type of information. In accordance with example embodiments described herein, test scope system 100 determines a scope of testing to be performed with respect to a machine code representation of program code based on change(s) that occur with respect to the program code. Detail regarding techniques for determining the scope of such testing is provided in the following discussion.

As shown in FIG. 1, test scope system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 104A-104N, so that user systems 102A-102M may access information that is available via the domains. Such domain may include Web pages, which may be provided as hypertext markup language (HTML) documents and objects (e.g., files) that are linked therein, for example.

It will be recognized that any one or more user systems 102A-102M may communicate with any one or more servers 106A-106N. Although user systems 102A-102M are depicted as desktop computers in FIG. 1, persons skilled in the relevant art(s) will appreciate that user systems 102A-102M may include any client-enabled system or device, including but not limited to a desktop computer, a laptop computer, a tablet computer, a personal digital assistant, a cellular telephone, or the like.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, video files, etc.), output of executables, or any other suitable type of information. In accordance with some example embodiments, servers 106A-106N are configured to host respective Web sites, so that the Web sites are accessible to users of test scope system 100.

One example type of computer program that may be executed by one or more of servers 106A-106N is a developer tool. A developer tool is a computer program that performs diagnostic operations (e.g., identifying source of problem, debugging, profiling, controlling, etc.) with respect to program code. Examples of a developer tool include but are not limited to a web development platform (e.g., Windows Azure Platform®, Amazon Web Services®, Google App Engine®, VMWare®, Force.com®, etc.) and an integrated development environment (e.g., Microsoft Visual Studio®, JDeveloper®, NetBeans®, Eclipse Platform™, etc.). It will be recognized that the example techniques described herein may be implemented using a developer tool.

First server(s) 106A is shown to include a change-based test scope determiner 108 for illustrative purposes. Change-based test scope determiner 108 is configured to determine a scope of testing to be performed with respect to a machine code representation of program code based on change(s) that occur with respect to the program code. For instance, change-based test scope determiner 108 may determine behavior(s) that are to be exhibited during execution of each code block of the machine code. Change-based test scope determiner 108 may determine the behavior(s) for each code block based on relationships between the code block and other code block(s), relationships between program data element(s) that are produced by and/or consumed by the code block, relationships between the code block and the program data element(s), and/or relationships between the code block and runtime attributes of the machine code. In an example embodiment, at least one of the code blocks of the machine code is a third-party code block (e.g., a library) that is used by the machine code. Change-based test scope determiner 108 may store correspondence information that indicates which of the code blocks corresponds to each of the behavior(s).

Change-based test scope determiner 108 may be configured to determine whether change(s) have occurred with respect to the program code. In response such change(s) occurring, change-based test scope determiner 108 may recommend that testing of the machine code include designated functionalities which are defined to test the machine code with regard to the behavior(s) of the machine code that are to be altered by occurrence of the change(s) with respect to the program code. For instance, change-based test scope determiner 108 may determine the designated functionalities to recommend based on the correspondence information. It will be recognized that change-based test scope determiner 108 may be (or may be included in) a developer tool, though the scope of the example embodiments is not limited in this respect. Example techniques for determining a scope of testing to be performed with respect to a machine code representation of program code based on change(s) that occur with respect to the program code are discussed in greater detail below with reference to FIGS. 2-4.

Change-based test scope determiner 108 may be implemented in various ways to determine a scope of testing to be performed with respect to a machine code representation of program code based on change(s) that occur with respect to the program code, including being implemented in hardware, software, firmware, or any combination thereof. For example, change-based test scope determiner 108 may be implemented as computer program code configured to be executed in one or more processors. In another example, change-based test scope determiner 108 may be implemented as hardware logic/electrical circuitry. In an embodiment, change-based test scope determiner 108 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Change-based test scope determiner 108 is shown to be incorporated in first server(s) 106A for illustrative purposes and is not intended to be limiting. It will be recognized that change-based test scope determiner 108 (or any portion(s) thereof) may be incorporated in any one or more of the user systems 102A-102M. For example, client-side aspects of change-based test scope determiner 108 may be incorporated in one or more of the user systems 102A-102M, and server-side aspects of change-based test scope determiner 108 may be incorporated in first server(s) 106A. In another example, change-based test scope determiner 108 may be distributed among the user systems 102A-102M. In yet another example, change-based test scope determiner 108 may be incorporated in a single one of the user systems 102A-102M. In another example, change-based test scope determiner 108 may be distributed among the server(s) 106A-106N. In still another example, change-based test scope determiner 108 may be incorporated in a single one of the server(s) 106A-106N.

Figure 2:
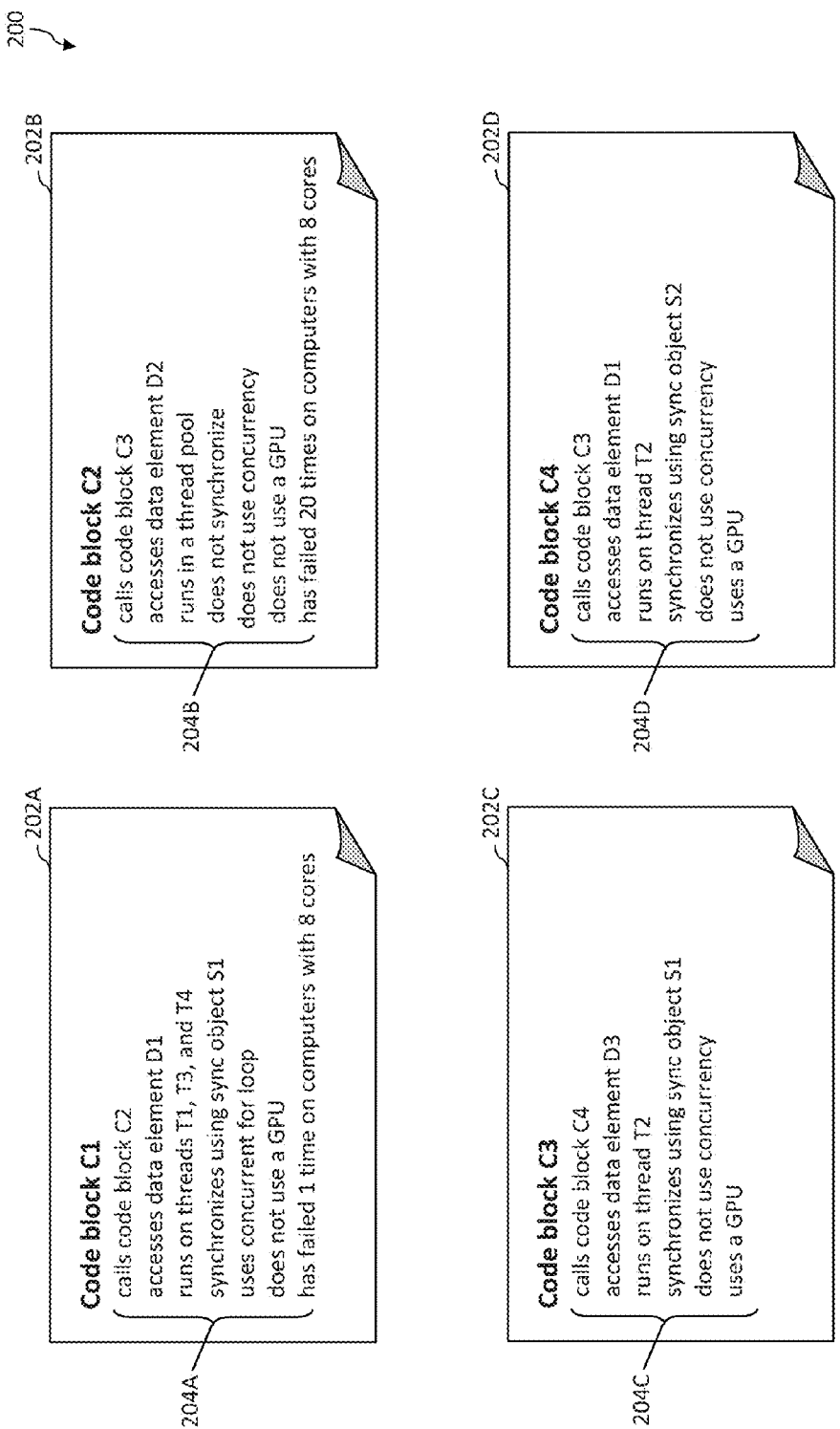
FIG. 2 depicts example portions of correspondence information in accordance with an embodiment.

FIG. 2 depicts example portions 202A-202D of correspondence information in accordance with an embodiment. Assume for purposes of illustration that machine code includes code blocks C1, C2, C3, and C4. As shown in FIG. 2, portion 202A of the correspondence information indicates that code block C1 corresponds to behaviors 204A. In particular, portion 202A indicates that code block C1 calls code block C2, accesses data element D1, runs on threads T1, T3, and T4, synchronizes using sync object S1, does not use a graphics processing unit (GPU), and has failed one time on a computer that has eight cores.

Portion 202B of the correspondence information indicates that code block C2 corresponds to behaviors 204B. In particular, portion 202B indicates that code block C2 calls code block C3, accesses data element D2, runs in a thread pool, does not synchronize, does not use concurrency, does not use a GPU, and has failed twenty times on computers that have eight cores.

Portion 202C of the correspondence information indicates that code block C3 corresponds to behaviors 204C. In particular, portion 202C indicates that code block C3 calls code block C4, accesses data element D3, runs on thread T2, synchronizes using sync object 51, does not use concurrency, and uses a GPU.

Portion 202D of the correspondence information indicates that code block C4 corresponds to behaviors 204D. In particular, portion 202D indicates that code block C4 calls code block C3, accesses data element D1, runs on thread T2, synchronizes using sync object S2, does not use concurrency, and uses a GPU.

Some example scenarios will now be described to illustrate how change-based test scope determiner 108 of FIG. 1 may use the portions 202A-202D of the correspondence information depicted in FIG. 2 to determine a scope of testing to be performed with respect to the machine code that includes the code blocks C1-C4. In a first scenario, a change is made to the concurrent for loop in code block C1. In response to this change, change-based test scope determiner 108 may recommend testing the machine code in an environment that supports concurrency (e.g., multiple threads and/or cores).

In a second scenario, a change is made in code block C3 to use synchronization object S2 instead of S1. In response to this change, change-based test scope determiner 108 may recommend performance of thread interleaving tests (such as those possible with CHESS) between code blocks Cl, C3, and C4, because code blocks Cl, C3, and C4 make use of the synchronization objects that are involved in the change. CHESS is a tool for finding and reproducing Heisenbugs in concurrent programs. Further information about CHESSS may be found at http://research.microsoft dot com/en-us/projects/chess/, for example.

In a third scenario, a change is made in code block C4 to the code that uses a GPU. In response to this change, change-based test scope determiner 108 may recommend testing the machine code across various families of GPUs.

In a fourth scenario, a change is made in code block C2. In response to this change, change-based test scope determiner 108 may recommend testing the machine code on a computer that includes eight cores, because code block C2 fails relatively more frequently on computers that include eight cores than code blocks C1, C3, and C4.

In a fifth scenario, a change is made in code block C1 to the code that accesses data element D1. For instance, the change may include changing computations that store data into data element D1. In response to this change, change-based test scope determiner 108 may recommend testing code block C4 because code block C4 also uses data element D1. This example can work in a shared memory scenario in which components share an address space or in a data exchange scenario in which data is exchanged between components (e.g., via a network). In accordance with one aspect, if data element D1 refers to a .NET object on the .NET runtime heap, and a change is made to code block C1 that changes the data stored in that .NET object, then change-based test scope determiner 108 may recommend testing code block C4 because code block C4 uses the .NET object. In accordance with another aspect, if data element D1 refers to JSON data that is exchanged between two components, and a change is made to code block C1 that changes the JSON data, change-based test scope determiner 108 may recommend testing code block C4 because code block C4 uses the JSON data.

In a sixth scenario, a designated code block (e.g., any of code blocks C1-C4) in a program reads from a configuration file that includes a set of input data with which to configure the program. For example, the program may be a stock trading program that is trained on historical data in the configuration file. In accordance with this example, if the configuration file is modified, change-based test scope determiner 108 may recommend performing tests that correspond to the designated code block, even if the code in the designated code block has not changed at all. Modification of the configuration file may result from someone checking into source control a new set of historical data on which the program is to run, data which came from another component in the system, data that was downloaded (e.g., via a network), data that was hand-generated, etc.

The example scenarios mentioned above are provided for illustrative purposes and are not intended to be limiting. It will be recognized that the example techniques described herein are applicable to any of a variety of scenarios.

Figure 3:
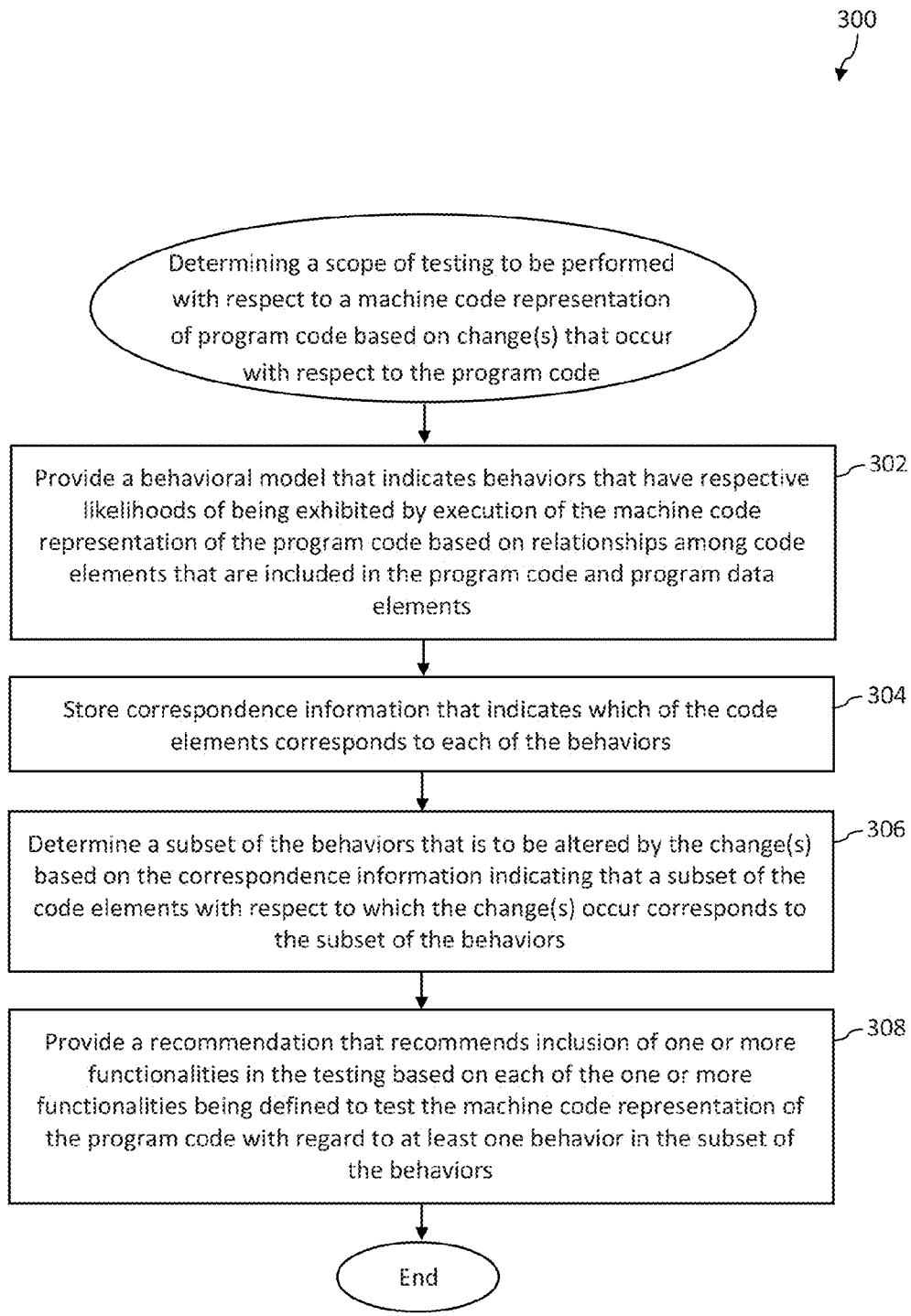
FIG. 3 depicts a flowchart of an example method for determining a scope of testing to be performed with respect to a machine code representation of program code based on change(s) that occur with respect to the program code in accordance with an embodiment.
Figure 4:
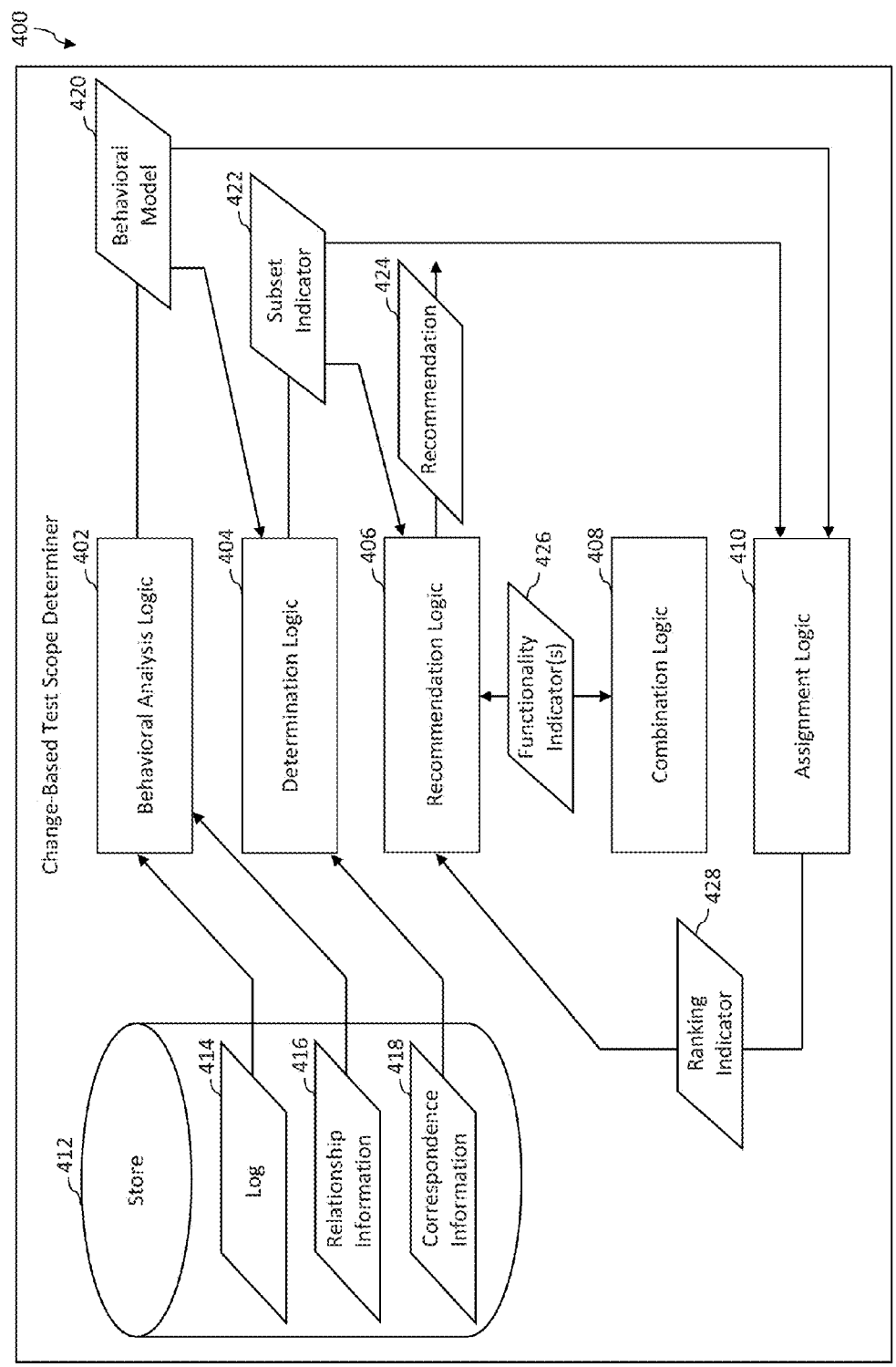
FIG. 4 is a block diagram of an example implementation of a change-based test scope determiner in accordance with an embodiment.

FIG. 3 depicts a flowchart 300 of an example method for determining a scope of testing to be performed with respect to a machine code representation of program code based on change(s) that occur with respect to the program code in accordance with an embodiment. Flowchart 300 may be performed by change-based test scope determiner 108 shown in FIG. 1, for example. For illustrative purposes, flowchart 300 is described with respect to change-based test scope determiner 400 shown in FIG. 4, which is an example of change-based test scope determiner 108, according to an embodiment. As shown in FIG. 4, change-based test scope determiner 400 includes behavioral analysis logic 402, determination logic 404, recommendation logic 406, combination logic 408, assignment logic 410, and store 412. Further structural and operational embodiments will be apparent to persons skilled in the relevant art(s) based on the discussion regarding flowchart 300.

As shown in FIG. 3, the method of flowchart 300 begins at step 302. In step 302, a behavioral model is provided (e.g., created, made available, delivered, etc.) that indicates behaviors that have respective likelihoods of being exhibited by execution of the machine code representation of the program code based on relationships among code elements that are included in the program code and program data elements. For instance, the program code may be source code. Each code element may be an instruction, statement, line, block, function, assembly, etc. Each program data element is produced by a first respective code element of the code elements and/or consumed by a second respective code element of the code elements.

The behavioral model may be provided in accordance with any of a variety of techniques, including but not limited to a static analysis technique and/or a runtime analysis technique. Examples of a static analysis technique include but are not limited to an abstract syntax tree (AST) technique, a control flow analysis technique, a data flow analysis technique, etc. Examples of runtime analysis technique include but are not limited to concurrency detection, program tracing, ETW tracing (e.g., a mechanism to trace and log software events), etc.

Examples of a behavior include but are not limited to a dependency of the machine code representation of the program code on one or more threads, an order in which code blocks of the machine code representation of the program code are executed, performance of concurrent operations by the machine code representation, occurrence of one or more data dependencies, calls between code blocks that are included in the machine code representation, read and/or write access of such code blocks to program data element(s), hardware usage (e.g., GPU usage, network usage, etc.) of the machine code representation, etc.

It will be recognized that the behavioral model may be provided based on factor(s) in addition to the relationships among the code elements and the program data elements. For instance, the behavioral model may be provided further based on metadata (e.g., annotations) associated with the program code. For instance, a first annotation may indicate that first code element(s) are associated with a first behavior of the machine code representation; a second annotation may indicate that second code element(s) are associated with a second behavior of the machine code representation, and so on.

In an example implementation, behavioral analysis logic 402 provides a behavioral model 420 that indicates the behaviors that have respective likelihoods of being exhibited by execution of the machine code representation of the program code. For example, store 412 may store relationship information 416, which specifies the relationships among the code elements and the program data elements. In accordance with this example, behavioral analysis logic 402 may provide the behavioral model 420 in response to receipt of the relationship information 416. Store 412 may be any suitable type of store. One type of store is a database. For instance, store 412 may be a relational database, an entity-relationship database, an object database, an object relational database, an extensible markup language (XML) database, etc.

In an example embodiment, the relationships include first relationship(s) of a first type, second relationship(s) of a second type, third relationship(s) of a third type, and/or fourth relationship(s) of a fourth type. Each of the first relationship(s) exists between a respective pair of the code elements. Each of the second relationship(s) exists between a respective pair of the program data elements. Each of the third relationship(s) exists between a respective program data element and a respective code element that produces or consumes the respective program data element. Each of the fourth relationship(s) exists between a respective code element and a respective runtime attribute of the program code. Examples of a runtime attribute include but are not limited to use of one or more threads, processes, GPUs, services, computers, memories, central processing units (CPUs), or networks by the machine code representation of the program code during runtime.

At step 304, correspondence information is stored that indicates which of the code elements corresponds to each of the behaviors. The correspondence information may be stored using any suitable storage mechanism, such as XML stored in files or rows of data stored in a relational database. In an example implementation, store 412 stores correspondence information 418, which indicates which of the code elements corresponds to each of the behaviors. Store 412 may be updated with data gathered over time (e.g., to be included in a log 414, relationship information 416, and/or correspondence information 418) as behavioral analysis logic 402 runs in the background, in service(s) in the cloud, or as users run the machine code representation of the program code. For instance, store 412 may be updated in real-time as the data is gathered.

In an example embodiment, step 304 includes storing first information that indicates portions of the machine code representation of the program code that correspond to the respective code elements. In accordance with this embodiment, step 304 further includes storing second information that indicates which of the portions corresponds to each of the behaviors.

At step 306, a subset of the behaviors that is to be altered by the change(s) is determined based on the correspondence information indicating that a subset of the code elements with respect to which the change(s) occur corresponds to the subset of the behaviors. In an example implementation, determination logic 404 determines the subset of the behaviors that is to be altered by the change(s). For example, determination logic 404 may provide a subset indicator 422, which specifies the subset of the behaviors that is to be altered by the change(s). In accordance with this example, determination logic 404 may provide the subset indicator 422 in response to receipt of the correspondence information 418.

At step 308, a recommendation that recommends inclusion of one or more functionalities in the testing is provided based on each of the one or more functionalities being defined to test the machine code representation of the program code with regard to at least one behavior in the subset of the behaviors. For instance, the recommendation may be provided based on each of the one or more functionalities being defined to indicate an extent to which at least one behavior in the subset of the behaviors is altered. It will be recognized that each of the one or more functionalities may be defined to test performance, correctness, security, reliability, and/or other aspect(s) of the machine code representation of the program code. In an example embodiment, the recommendation may include a reason for recommending inclusion of at least one of the one or more functionalities in the testing.

In an example implementation, recommendation logic 406 provides a recommendation 424, which recommends inclusion of the one or more functionalities in the testing. For instance, recommendation logic 406 may provide the recommendation 424 in response to receipt of the subset indicator 422.

In an example embodiment, the subset of the behaviors includes execution of the machine code representation of the program code in a designated environment. In accordance with this embodiment, a designated functionality of the one or more functionalities tests the machine code representation of the program code while the machine code representation of the program code executes in the designated environment.

In another example embodiment, the subset of the behaviors includes processing one or more designated types of input during execution of the machine code representation of the program code. Examples of a designated type of input include but are not limited to a null string, a non-null string, a string that includes a specified number of characters, a string that includes English, a string that includes non-Latin characters, etc. It will be recognized that these examples are provided for illustrative purposes and are not intended to be limiting. For instance, a designated type of input need not necessarily be a string or type thereof. In accordance with this embodiment, a designated functionality of the one or more functionalities tests the machine code representation of the program code based on the machine code representation of the program code processing the one or more designated types of input.

In yet another example embodiment, the subset of the behaviors includes utilizing concurrent threads during execution of the machine code representation of the program code. In accordance with this embodiment, a designated functionality of the one or more functionalities tests the machine code representation of the program code in an environment that supports concurrent threads. For instance, the designated functionality may test the machine code representation of the program code while the machine code representation of the program code executes across a plurality of processing cores.

In still another example embodiment, the subset of the behaviors includes consumption of a designated program data element by a designated second code element. In accordance with this embodiment, a designated functionality of the one or more functionalities tests at least a portion of the machine code representation of the program code that corresponds to the designated second code element based on a change of the designated second code element causing a replacement program data element to be consumed by the designated second code element in lieu of the designated program data element.

In another example embodiment, the subset of the behaviors includes execution of the machine code representation of the program code using a graphics processing unit. In accordance with this embodiment, a designated functionality of the one or more functionalities tests the machine code representation of the program code while the machine code representation of the program code executes on each of a plurality graphics processing unit types. Examples of a type include but are not limited to a specified model, series, generation, or brand. This embodiment is described with respect to graphics processing units for purposes of illustration and is not intended to be limiting. Persons skilled in the relevant art(s) will recognize that this embodiment is applicable to any suitable category of processing units, including but not limited to graphics processing units (GPUs), network processing units (NPUs), floating point units (FPUs), etc.

In still another example embodiment, the recommendation may be provided based on factor(s) in addition to each of the one or more functionalities being defined to test the machine code representation of the program code with regard to at least one behavior in the subset of the behaviors. For instance, the recommendation may be provided further based on information regarding a production execution environment in which the machine code representation of the program code is to run. For example, such information may specify that the production execution environment does not include GPUs. In accordance with this example, a functionality defined to test the machine code representation of the program code with regard to use of a GPU may be excluded from the one or more functionalities (e.g., to save time and/or cost), even if the subset of the behaviors that is to be altered by the change(s) includes use of a GPU.

In some example embodiments, one or more steps 302, 304, 306, and/or 308 of flowchart 300 may not be performed. Moreover, steps in addition to or in lieu of steps 302, 304, 306, and/or 308 may be performed. For instance, in an example embodiment, flowchart 300 includes combining duplicative instances of each functionality in the one or more functionalities to provide a single instance of the respective functionality in the one or more functionalities. In accordance with this embodiment, step 308 is performed in response to combining the duplicative instances of each functionality to provide the single instance of the respective functionality in the one or more functionalities.

In an example implementation, combination logic 408 combines the duplicative instance of each functionality in the one or more functionalities to provide the single instance of the respective functionality in the one or more functionalities. For instance, combination logic 408 may receive functionality indicator(s) 426 from recommendation logic 406. The functionality indicator(s) 426 may specify the one or more functionalities, including duplicative instances. Combination logic 408 may update the functionality indicator(s) 426 to remove the duplicative instances, such that the functionality indicator(s) 426 specify a single instance of each functionality in the one or more functionalities. Combination logic 408 may provide the updated version of the functionality indicator(s) 426 to recommendation logic 406 for processing. For instance, recommendation logic 406 may provide recommendation 424 in response to receipt of the updated version of the functionality indicator(s) 426.

In another example embodiment, flowchart 300 includes assigning a ranking to each functionality in the one or more functionalities based on the likelihood(s) of the respective behavior(s) that correspond to the respective functionality to be exhibited by execution of the machine code representation of the program code. In accordance with this embodiment, step 308 includes providing the recommendation to indicate the one or more functionalities in an order that is based on the ranking that is assigned to each functionality.

In an example implementation, assignment logic 410 assigns the ranking to each functionality in the one or more functionalities. For example, assignment logic 410 may derive the likelihood(s) of the respective behavior(s) that correspond to each functionality to be exhibited by the machine code representation of the program code from the behavioral model 420. In another example, assignment logic 410 may determine the one or more functionalities based on the subset indicator 422, which specifies the subset of the behaviors that is to be altered by the change(s). Assignment logic 410 may generate a ranking indicator 428. In a first aspect of this implementation, ranking indicator 428 may specify the ranking that is assigned to each functionality. In another aspect, ranking indicator 428 may specifies the order of the one or more functionalities based on the ranking that is assigned to each functionality. In accordance with this implementation, recommendation logic 406 provides the recommendation 424 to indicate the one or more functionalities in the order based on the ranking indicator 428.

In yet another example embodiment, the subset of the behaviors includes execution of the machine code representation of the program code in a designated programming runtime environment. A programming runtime environment is a software component that supports execution of computer programs written in designated computer programming language(s) by translating intermediate language (IL) instructions into machine instructions. For instance, Java Runtime Environment® (JRE), developed and distributed by Sun Microsystems, Inc. (now Oracle America, Inc.), is an example of a programming runtime environment that supports execution of computer programs written in the Java® programming language. Common Language Runtime® (CLR), developed and distributed by Microsoft Corporation, is an example of a programming runtime environment that supports execution of computer programs written in a variety of languages.

In accordance with this embodiment, flowchart 300 includes determining each programming runtime environment of a plurality of programming runtime environments that has runtime characteristics that are different from others of the plurality of programming runtime environments to provide a subset of the programming runtime environments. For instance, determination logic 404 may determine each programming runtime environment of the plurality of programming runtime environments that has runtime characteristics that are different from others of the plurality of programming runtime environments. In further accordance with this embodiment, a designated functionality of the one or more functionalities tests the machine code representation of the program code while the machine code representation of the program code executes in each programming runtime environment in the subset of the programming runtime environments.

In still another example embodiment, flowchart 300 includes updating the behavioral model to take into consideration one or more previous executions of the machine language representation of the program code. For instance, the behavioral model may be updated to take into consideration one or more previous changes to the program code, one or more functionalities that are included in previous testing of the machine code representation of the program code, whether the previous testing (or functionalities therein) with regard to the one or more functionalities succeeded (or failed), etc. In an example implementation, behavioral analysis logic 402 updates the behavioral model 420 to take into consideration the one or more previous executions of the machine language representation of the program code. In accordance with this implementation, log 414 may include information regarding the one or more previous executions (e.g., information regarding previous change(s) to the program code, information regarding functionalit(ies) in previous testing, etc.). In further accordance with this implementation, behavioral analysis logic 402 may update the behavioral model 420 in response to receipt of the log 414.

It will be recognized that change-based test scope determiner 400 may not include one or more of behavioral analysis logic 402, determination logic 404, recommendation logic 406, combination logic 408, assignment logic 410, and/or store 412. Furthermore, change-based test scope determiner 400 may include components in addition to or in lieu of behavioral analysis logic 402, determination logic 404, recommendation logic 406, combination logic 408, assignment logic 410, and/or store 412.

Any one or more of user systems 102A-102M, any one or more of servers 106A-106N, change-based test scope determiner 108, behavioral analysis logic 402, determination logic 404, recommendation logic 406, combination logic 408, assignment logic 410, and/or flowchart 300 may be implemented in hardware, software, firmware, or any combination thereof.

For example, any one or more of user systems 102A-102M, any one or more of servers 106A-106N, change-based test scope determiner 108, behavioral analysis logic 402, determination logic 404, recommendation logic 406, combination logic 408, assignment logic 410, and/or flowchart 300 may be implemented as computer program code configured to be executed in one or more processors.

In another example, any one or more of user systems 102A-102M, any one or more of servers 106A-106N, change-based test scope determiner 108, behavioral analysis logic 402, determination logic 404, recommendation logic 406, combination logic 408, assignment logic 410, and/or flowchart 300 may be implemented as hardware logic/electrical circuitry.

For instance, in an embodiment, one or more of user systems 102A-102M, one or more of servers 106A-106N, change-based test scope determiner 108, behavioral analysis logic 402, determination logic 404, recommendation logic 406, combination logic 408, assignment logic 410, and/or flowchart 300 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 5:
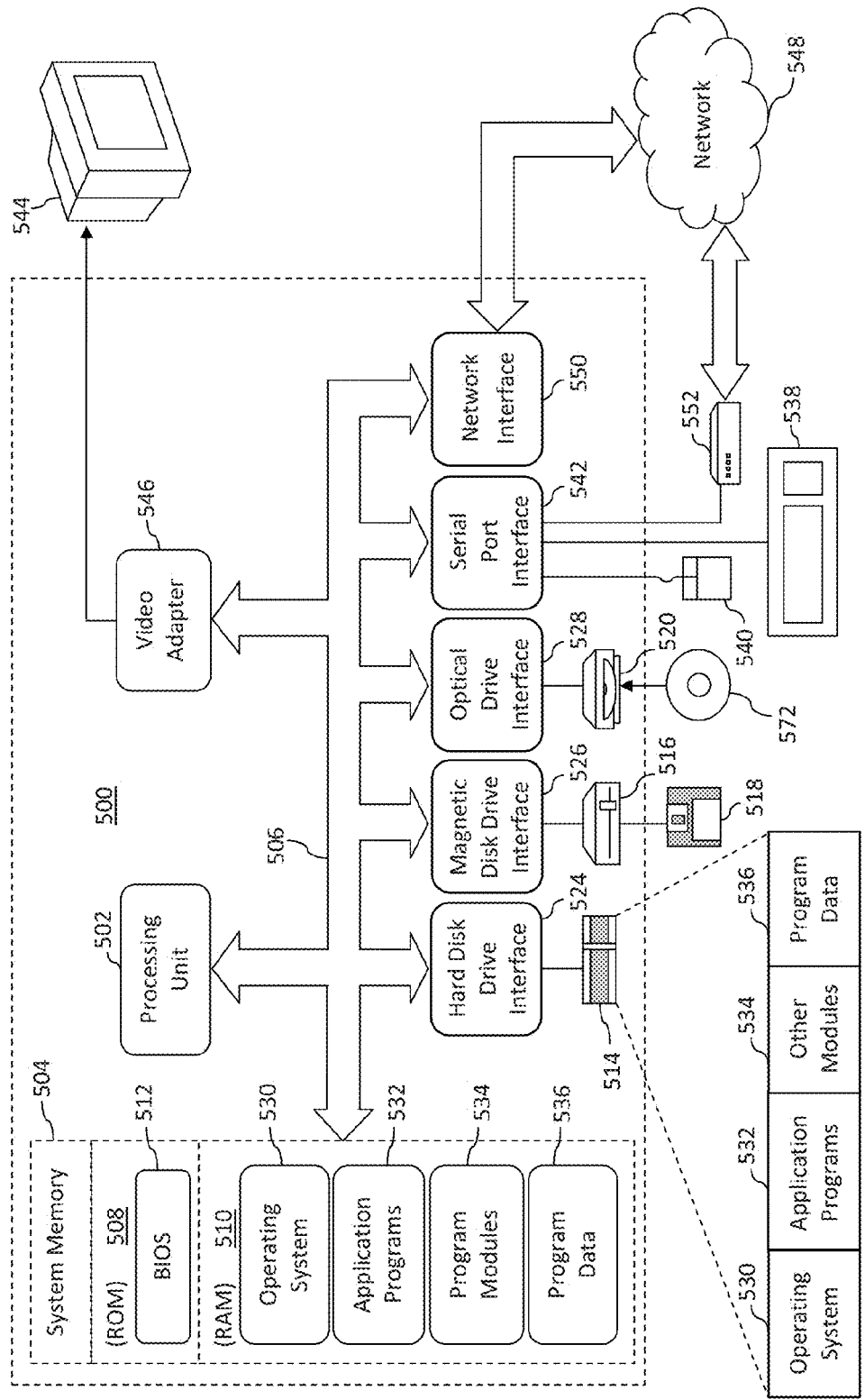
FIG. 5 depicts an example computer in which embodiments may be implemented.

FIG. 5 depicts an example computer 500 in which embodiments may be implemented. Any one or more of user systems 102A-102M and/or any one or more of file servers 106A-106N shown in FIG. 1 may be implemented using computer 500, including one or more features of computer 500 and/or alternative features. Computer 500 may be a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 530, one or more application programs 532, other program modules 534, and program data 536. Application programs 532 or program modules 534 may include, for example, computer program logic for implementing any one or more of change-based test scope determiner 108, behavioral analysis logic 402, determination logic 404, recommendation logic 406, combination logic 408, assignment logic 410, and/or flowchart 300 (including any step of flowchart 300), as described herein.

A user may enter commands and information into the computer 500 through input devices such as keyboard 538 and pointing device 540. Other input devices (not shown) may include a microphone, joystick, game pad, satellite dish, scanner, touch screen, camera, accelerometer, gyroscope, or the like. These and other input devices are often connected to the processing unit 502 through a serial port interface 542 that is coupled to bus 506, but may be connected by other interfaces, such as a parallel port, game port, or a universal serial bus (USB).

A display device 544 (e.g., a monitor) is also connected to bus 506 via an interface, such as a video adapter 546. In addition to display device 544, computer 500 may include other peripheral output devices (not shown) such as speakers and printers.

Computer 500 is connected to a network 548 (e.g., the Internet) through a network interface or adapter 550, a modem 552, or other means for establishing communications over the network. Modem 552, which may be internal or external, is connected to bus 506 via serial port interface 542.

As used herein, the terms "computer program medium," "computer-readable medium," and "computer-readable storage medium" are used to generally refer to media such as the hard disk associated with hard disk drive 514, removable magnetic disk 518, removable optical disk 522, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

IV. CONCLUSION

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A system that determines a scope of testing to be performed with respect to a machine code representation of program code based on one or more changes that occur with respect to the program code, the system comprising:

behavioral analysis logic configured to create a behavioral model that indicates a plurality of behaviors that have a plurality of respective likelihoods of being exhibited by execution of the machine code representation of the program code based on a plurality of relationships among a plurality of code elements that are included in the program code and a plurality of program data elements, each program data element being at least one of produced by a first respective code element of the plurality of code elements or consumed by a second respective code element of the plurality of code elements;

a store configured to store correspondence information that includes a list of behaviors for each code element of the plurality of code elements, each list of behaviors specifying each behavior of the plurality of behaviors that corresponds to the respective code element;

determination logic configured to determine a subset of the plurality of behaviors that is to be altered by the one or more changes based on a subset of the lists of behaviors indicating that a subset of the plurality of code elements with respect to which the one or more changes occur corresponds to the subset of the plurality of behaviors; and recommendation logic configured to provide a recommendation to a user, the recommendation recommending one or more functionalities for selection by the user to be included in the testing, based on each of the one or more functionalities being defined to test the machine code representation of the program code with regard to at least one behavior in the subset of the plurality of behaviors.

2. The system of claim 1, wherein the plurality of relationships includes one or more relationships of a first type, one or more relationships of a second type, and one or more relationships of a third type;

wherein each of the one or more relationships of the first type exists between a respective pair of code elements in the plurality of code elements;

wherein each of the one or more relationships of the second type exists between a respective pair of program data elements in the plurality of program data elements; and wherein each of the one or more relationships of the third type exists between a respective program data element in the plurality of program data elements and a respective code element in the plurality of code elements that produces or consumes the respective program data element.

3. The system of claim 2, wherein the plurality of relationships further includes one or more relationships of a fourth type; and wherein each of the one or more relationships of the fourth type exists between a respective code element in the plurality of code elements and a respective runtime attribute of the program code.

4. The system of claim 1, wherein the store is configured to store first information that indicates a plurality of portions of the machine code representation of the program code that corresponds to the plurality of respective code elements; and
  wherein the store is further configured to store second information that indicates which of the plurality of portions corresponds to each behavior of the plurality of behaviors.

5. The system of claim 1, wherein the recommendation includes a reason for recommending inclusion of at least one of the one or more functionalities in the testing.

6. The system of claim 1, further comprising:
  combination logic configured to combine duplicative instances of each functionality in the one or more functionalities to provide a single instance of the respective functionality in the one or more functionalities;
  wherein the recommendation logic is configured to provide the recommendation in response to the duplicative instances of each functionality being combined to provide the single instance of the respective functionality in the one or more functionalities.

7. The system of claim 1, further comprising:
  assignment logic configured to assign a ranking to each functionality in the one or more functionalities based on the at least one likelihood of the respective at least one behavior that corresponds to the respective functionality to be exhibited by execution of the machine code representation of the program code;
  wherein the recommendation logic is configured to provide the recommendation to indicate the one or more functionalities in an order that is based on the ranking that is assigned to each functionality.

8. The system of claim 1, wherein the subset of the plurality of behaviors includes execution of the machine code representation of the program code in a designated environment; and
  wherein a designated functionality of the one or more functionalities tests the machine code representation of the program code while the machine code representation of the program code executes in the designated environment.

9. The system of claim 1, wherein the subset of the plurality of behaviors includes one or more designated types of input being processed during execution of the machine code representation of the program code; and
  wherein a designated functionality of the one or more functionalities tests the machine code representation of the program code based on the machine code representation of the program code processing the one or more designated types of input.

10. The system of claim 1, wherein the subset of the plurality of behaviors includes utilization of a plurality of concurrent threads during execution of the machine code representation of the program code; and
  wherein a designated functionality of the one or more functionalities tests the machine code representation of the program code in an environment that supports concurrent threads.

11. The system of claim 1, wherein the subset of the plurality of behaviors includes execution of the machine code representation of the program code in a designated programming runtime environment;
  wherein the determination logic is configured to determine each programming runtime environment of a plurality of programming runtime environments that has runtime characteristics that are different from others of the plurality of programming runtime environments to provide a subset of the programming runtime environments; and
  wherein a designated functionality of the one or more functionalities tests the machine code representation of the program code while the machine code representation of the program code executes in each programming runtime environment in the subset of the programming runtime environments.

12. The system of claim 1, wherein the subset of the plurality of behaviors includes consumption of a designated program data element of the plurality of program data elements by a designated second code element of the plurality of code elements; and
  wherein a designated functionality of the one or more functionalities tests at least a portion of the machine code representation of the program code that corresponds to the designated second code element based on a change of the designated second code element causing a replacement program data element to be consumed by the designated second code element in lieu of the designated program data element.

13. The system of claim 1, wherein the subset of the plurality of behaviors includes execution of the machine code representation of the program code using a processing unit that is included in a designated class of processing units; and
  wherein a designated functionality of the one or more functionalities tests the machine code representation of the program code while the machine code representation of the program code executes on each of a plurality of processing unit types that are included in the designated class.

14. The system of claim 1, wherein the behavioral analysis logic is configured to update the behavioral model to take into consideration one or more previous executions of the machine language representation of the program code.

15. A computer program product comprising a computer-readable storage medium having computer program logic recorded thereon for enabling a processor-based system to determine a scope of testing to be performed with respect to a machine code representation of program code based on one or more changes that occur with respect to the program code, the computer program product comprising:
  a first program logic module for enabling the processor-based system to provide a behavioral model that indicates a plurality of behaviors that have a plurality of respective likelihoods of being exhibited by execution of the machine code representation of the program code based on a plurality of relationships among a plurality of code elements that are included in the program code and a plurality of program data elements, each program data element being at least one of produced by a first respective code element of the plurality of code elements or consumed by a second respective code element of the plurality of code elements;
  a second program logic module for enabling the processor-based system to determine a subset of the plurality of behaviors that is to be altered by the one or more changes based on a subset of a plurality of behavior lists indicating that a subset of the plurality of code elements with respect to which the one or more changes occur corresponds to the subset of the plurality of behaviors, the correspondence information including a behavior list of the plurality of behavior lists for each code element of the plurality of code elements, each behavior list specifying each behavior of the plurality of behaviors that corresponds to the respective code element; and a third program logic module for enabling the processor-based system to provide a recommendation to a user, the recommendation recommending one or more functionalities for selection by the user to be included in the testing, based on each of the one or more functionalities being defined to test the machine code representation of the program code with regard to at least one behavior in the subset of the plurality of behaviors.

16. The computer program product of claim 15, further comprising:

a fourth program logic module for enabling the processor-based system to assign a ranking to each functionality in the one or more functionalities based on the at least one likelihood of the respective at least one behavior that corresponds to the respective functionality to be exhibited by execution of the machine code representation of the program code;

wherein the third program logic module comprises:
logic for enabling the processor-based system to provide the recommendation to indicate the one or more functionalities in an order that is based on the ranking that is assigned to each functionality.

17. The computer program product of claim 15, wherein the subset of the plurality of behaviors includes execution of the machine code representation of the program code in a designated programming runtime environment;

wherein the second program logic module comprises:
logic for enabling the processor-based system to determine each programming runtime environment of a plurality of programming runtime environments that has runtime characteristics that are different from others of the plurality of programming runtime environments to provide a subset of the programming runtime environments; and wherein a designated functionality of the one or more functionalities tests the machine code representation of the program code while the machine code representation of the program code executes in each programming runtime environment in the subset of the programming runtime environments.

18. A method of determining a scope of testing to be performed with respect to a machine code representation of program code based on one or more changes that occur with respect to the program code, the method comprising:

creating a behavioral model that indicates a plurality of behaviors that have a plurality of respective likelihoods of being exhibited by execution of the machine code representation of the program code based on a plurality of relationships among a plurality of code elements that are included in the program code and a plurality of program data elements, each program data element being at least one of produced by a first respective code element of the plurality of code elements or consumed by a second respective code element of the plurality of code elements, the plurality of relationships including one or more relationships of a first type, one or more relationships of a second type, and one or more relationships of a third type, each of the one or more relationships of the first type existing between a respective pair of code elements in the plurality of code elements, each of the one or more relationships of the second type existing between a respective pair of program data elements in the plurality of program data elements, each of the one or more relationships of the third type existing between a respective program data element in the plurality of program data elements and a respective code element in the plurality of code elements that produces or consumes the respective program data element;

storing correspondence information that includes a list of behaviors for each code element of the plurality of code elements, each list of behaviors specifying each behavior of the plurality of behaviors that corresponds to the respective code element;

determining a subset of the plurality of behaviors that is to be altered by the one or more changes based on a subset of the lists of behaviors indicating that a subset of the plurality of code elements with respect to which the one or more changes occur corresponds to the subset of the plurality of behaviors; and providing a recommendation to a user, the recommendation recommending one or more functionalities for selection by the user to be included in the testing, based on each of the one or more functionalities being defined to test the machine code representation of the program code with regard to at least one behavior in the subset of the plurality of behaviors.

19. The method of claim 18, wherein the subset of the plurality of behaviors includes processing one or more designated types of input during execution of the machine code representation of the program code; and wherein a designated functionality of the one or more functionalities tests the machine code representation of the program code based on the machine code representation of the program code processing the one or more designated types of input.

20. The method of claim 18, wherein the subset of the plurality of behaviors includes utilizing a plurality of concurrent threads during execution of the machine code representation of the program code; and wherein a designated functionality of the one or more functionalities tests the machine code representation of the program code in an environment that supports concurrent threads.

* * * * *